United States Patent
Boehm

(10) Patent No.: US 12,168,426 B2
(45) Date of Patent: Dec. 17, 2024

(54) ELECTROMECHANICALLY DRIVABLE BRAKE PRESSURE GENERATOR

(71) Applicant: Robert Bosch GmbH, Stuttgart (DE)

(72) Inventor: Mark Boehm, Lehrensteinsfeld (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/769,117

(22) PCT Filed: Aug. 20, 2020

(86) PCT No.: PCT/EP2020/073346
§ 371 (c)(1),
(2) Date: Apr. 14, 2022

(87) PCT Pub. No.: WO2021/094007
PCT Pub. Date: May 20, 2021

(65) Prior Publication Data
US 2024/0109525 A1    Apr. 4, 2024

(30) Foreign Application Priority Data

Nov. 14, 2019  (DE) .................. 10 2019 217 551.1

(51) Int. Cl.
*B60T 13/16* (2006.01)
*B60T 13/74* (2006.01)
*F16H 57/08* (2006.01)

(52) U.S. Cl.
CPC .......... *B60T 13/745* (2013.01); *B60Y 2400/73* (2013.01)

(58) Field of Classification Search
CPC . B60T 13/745; B60T 13/168; B60Y 2400/73; F04B 17/03; F16H 57/082
See application file for complete search history.

(56) References Cited

U.S. PATENT DOCUMENTS 10,408,316 B2 *  9/2019  Rompel ................. B25F 5/001
11,208,088 B2 * 12/2021  Micke .................. B60T 8/4018
(Continued)

FOREIGN PATENT DOCUMENTS

CN         104976256 A    10/2015
CN         105317893 A    2/2016
(Continued)

OTHER PUBLICATIONS

International Search Report for PCT/EP2020/073346, Issued Dec. 10, 2020.

*Primary Examiner* — Thomas W Irvin
(74) *Attorney, Agent, or Firm* — NORTON ROSE FULBRIGHT US LLP; Gerard A. Messina

(57) ABSTRACT

An electromechanically drivable brake pressure generator for a hydraulic braking system of a vehicle. The electromechanically drivable brake pressure generator includes an electric motor, using which a driving rotational speed is generatable; a planetary gear, which is driven on the input side by the electric motor to convert the driving rotational speed of the electric motor into a slower rotational speed, the planetary gear including an annulus gear, accommodated rotatably fixedly thereto in an annulus gear receptacle; and a hydraulic module, which is connected to an output side of the planetary gear and using which a brake pressure is generatable. A torque support is situated between the annulus gear and the annulus gear receptacle, which extends in an axial direction to the planetary gear and which cooperates with a recess so that the annulus gear and the annulus gear receptacle are held rotatably fixedly with respect to one another.

16 Claims, 2 Drawing Sheets

(56) References Cited

U.S. PATENT DOCUMENTS

| | | | |
|---|---|---|---|
| 11,318,921 B2* | 5/2022 | Weh | F04B 53/16 |
| 2017/0167585 A1* | 6/2017 | Rompel | F16D 7/06 |
| 2018/0326959 A1* | 11/2018 | Micke | B60T 8/4081 |
| 2020/0062231 A1* | 2/2020 | Micke | F16H 25/20 |
| 2020/0361434 A1* | 11/2020 | Weh | B60T 8/4018 |
| 2022/0024435 A1* | 1/2022 | Tuerk | F16C 19/30 |
| 2022/0126807 A1* | 4/2022 | Oehler | B60T 13/745 |
| 2022/0306065 A1* | 9/2022 | Oehler | B60T 13/745 |
| 2022/0348178 A1* | 11/2022 | Oehler | F04B 9/02 |
| 2023/0001909 A1* | 1/2023 | Oehler | B60T 13/745 |
| 2023/0286482 A1* | 9/2023 | Boehm | F16D 55/226 |
| 2024/0075917 A1* | 3/2024 | Haufe | F15B 15/02 |
| 2024/0101094 A1* | 3/2024 | Oehler | F16H 55/06 |

FOREIGN PATENT DOCUMENTS

| | | |
|---|---|---|
| CN | 108290562 A | 7/2018 |
| DE | 102015119173 A1 | 5/2017 |
| DE | 102016218639 A1 | 3/2018 |
| EP | 3121443 A1 | 1/2017 |
| EP | 3502516 A1 | 6/2019 |
| JP | 2011179658 A | 9/2011 |
| JP | 2012229741 A | 11/2012 |
| JP | 2013064454 A | 4/2013 |
| JP | 2019116213 A | 7/2019 |
| WO | 2012013314 A2 | 2/2012 |
| WO | 2017093028 A1 | 6/2017 |

* cited by examiner

ELECTROMECHANICALLY DRIVABLE BRAKE PRESSURE GENERATOR

FIELD

The present invention relates to an electromechanically drivable brake pressure generator for a hydraulic braking system of a vehicle including an electric motor, with the aid of which a driving rotational speed is generatable, a planetary gear, which is driven on the input side by the electric motor to render a gear ratio of the driving rotational speed to be slow, the planetary gear including an annulus gear, which for this purpose is rotatably fixedly accommodated in an annulus gear receptacle, and a hydraulic module, which is connected to an output side of the planetary gear and with the aid of which a brake pressure is generatable. The present invention furthermore relates to a vehicle which includes such an electromechanically drivable brake pressure generator.

BACKGROUND INFORMATION

The foot force of the driver is typically not sufficient for decelerating motor vehicles, so that they are usually equipped with a brake booster. Conventional brake boosters in general operate with the aid of a vacuum generated by the internal combustion engine. The pressure difference between the engine pressure and the ambient pressure is used in the process to apply a boosting force, in addition to the foot force of the driver.

Alternative brake pressure buildup devices are needed for future drive concepts of motor vehicles since the vacuum is no longer available to operate a conventional vacuum brake booster. For this purpose, the electromechanical brake pressure generators of interest here were developed.

The actuating force is generated in the process with the aid of an electric motor, which activates a movement of a hydraulic piston via a gear to generate a brake pressure. Such electromechanical brake pressure generators may not only be used to provide an auxiliary force, but in brake by wire systems also to single-handedly provide the actuating force.

Electromechanical brake pressure generators are thus of advantage, in particular, with respect to autonomous driving.

An electromechanical brake booster is described in PCT Patent Application No. WO 2012/013314 A2, which boosts a pedal force introduced via a ball spindle. For this purpose, a recirculating ball nut is situated at the ball spindle, which is driven via a planetary gear by an electric motor for boosting the pedal force.

It is An object of the present invention to provide an electromechanically drivable brake pressure generator for a hydraulic braking system of a vehicle, which has a reduced installation space.

SUMMARY

The object may be achieved by an electromechanically drivable brake pressure generator according to the present invention. Advantageous refinements of the present invention are disclosed herein. The present invention also provides a vehicle including a hydraulic braking system including the electromechanically drivable brake pressure generator according to the present invention.

In accordance with an example embodiment of the present invention, at least one torque support is situated between the annulus gear and the annulus gear receptacle, which extends in an axial direction to the planetary gear and which cooperates with a recess so that the annulus gear and the annulus gear receptacle are held rotatably fixedly with respect to one another.

Within the meaning of the present invention, a hydraulic module shall be understood to mean a module via which the rotatory motion of the planetary gear is converted into a motion of a hydraulic piston for generating a brake pressure for the electromechanical brake pressure generator. This is preferably designed via a spindle-nut arrangement, via which this rotatory motion is converted into a translatory motion of the hydraulic piston in a hydraulic cylinder.

According to an example embodiment of the present invention, a torque support is a design element with the aid of which a torque is absorbable. For this purpose, the torque support cooperates with a correspondingly shaped recess, so that a relative rotary motion of these two components with respect to one another is prevented. Preferably, at least two torque supports are provided. Particularly preferably, multiple torque supports are provided, which are equidistantly situated with respect to one another. In the present invention, the torque support is axially designed. In this way, installation space may be saved compared to a radial torque support, with the same gear ratio.

However, it is particularly preferred that this saved installation space is utilized to design the annulus gear with a larger diameter. In this way, a larger gear ratio is possible. Accordingly, the motor may be driven at a higher rotational speed, for example. In this way, a shorter active length of the motor is possible. The motor may consequently be designed to be smaller, thereby saving installation space and costs for the motor.

In one preferred embodiment of the present invention, the at least one torque support is fixedly connected to the annulus gear and/or to the annulus gear receptacle. Within the meaning of the present invention, fixedly shall be understood to mean that the torque support is either designed in one piece by the corresponding component, or is at least fixedly connected thereto by screwing, welding or the like. In this way, it is possible that the torque support is formed both by the annulus gear and by the annulus gear receptacle, or by both. In this way, a high flexibility of the torque support may be achieved.

Corresponding to one further preferred embodiment of the present invention, the at least one torque support engages in a recess of the annulus gear receptacle and/or of the annulus gear for rotatably fixedly connecting the annulus gear and the annulus gear receptacle. The recess may also be formed here by the annulus gear, the annulus gear receptacle or by both. In the process, recess shall be understood to mean at least one material removal so that at least one cavity is formed. This recess preferably has the same shape as the torque support. Accordingly, a form fit is thereby achieved, by which an anti-twist protection, which essentially has no play, is ensured.

The at least one torque support preferably has a pin-shaped design. Such a round pin-shaped torque support has the advantage that it is easily introducible into a borehole created by a drilling process. In particular, a pin-shaped element may be inserted into a borehole of this component after the annulus gear or the annulus gear receptacle has been manufactured, and may be fixedly connected to this component. During assembly, the pin may be introduced into a corresponding borehole of a counterpart.

In one advantageous refinement of the present invention, the recess is designed as a breakthrough. In the process, breakthrough shall be understood to mean a recess which protrudes completely through the material thickness in which it is created. The recess thus extends over the entire material thickness. With the aid of such breakthroughs, it is possible, in particular, to transfer a high torque, even in the case of thin-walled material, into which the recess is to be introduced.

The at least one torque support is advantageously caulked at an axial outer side of the annulus gear receptacle. As a result of the caulking, the torque support is thus radially expanded at the outer side in the manner of the riveting process. In this way, the annulus gear and the annulus gear receptacle are axially attached with respect to one another. In addition, a play due to the manufacturing tolerance is eliminated by the caulking in the area of the breakthrough.

In one further advantageous embodiment of the present invention, the at least one torque support is designed in the form of a deep-drawn element of the annulus gear receptacle, which engages in a recess of the annulus gear. Such torque supports may be easily and economically created by a deep drawing step. These torque supports may also be introduced after an assembly of the annulus gear and the annulus gear receptacle, so that the torque supports may be provided in locations at which the corresponding recesses are situated.

According to one advantageous embodiment of the present invention, the at least one torque support is made of a plastic material. A plastic material has the advantage that it has a low weight and is easily manufacturable by way of the injection molding process. A plastic material also has low material costs. In this way, an electromechanically drivable brake pressure generator which is economically manufacturable may be provided by such a material. The plastic material additionally has the advantage that the caulking may be designed as hot caulking during which the plastic material is melted. Such a hot caulking is easy to manufacture.

Exemplary embodiments of the present invention are shown in the figures and are described in greater detail in the following description.

DETAILED DESCRIPTION OF EXAMPLE EMBODIMENTS

Figure 1:
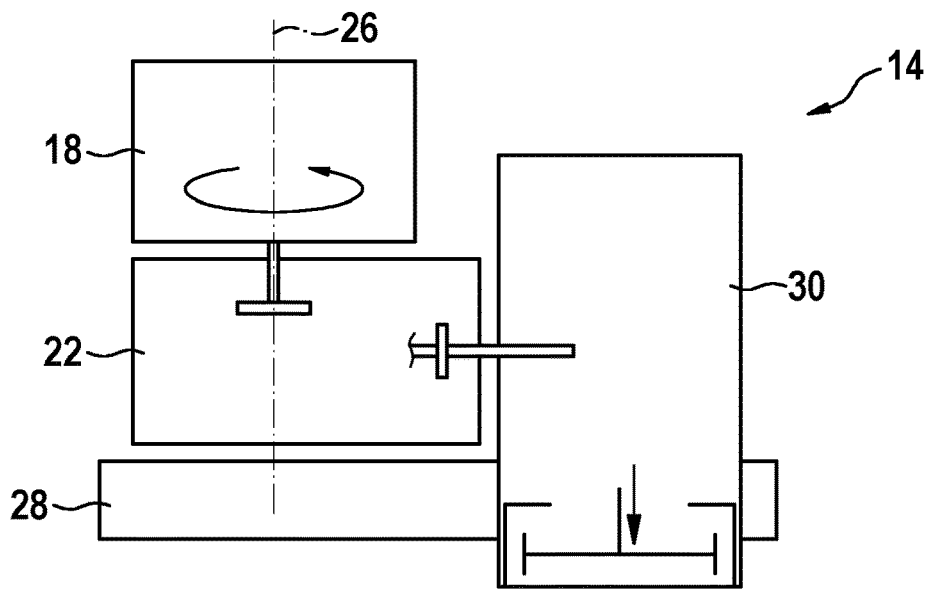
FIG. 1 shows a schematic representation of one exemplary embodiment of a drive train of the electromechanical brake pressure generator according to an example embodiment of the present invention.

FIG. 1 shows a schematic representation of one exemplary embodiment of a drive train 14 of an electromechanical brake pressure generator according to the present invention. Drive train 14 includes an electric motor 18, with the aid of which a driving rotational speed is generatable. Electric motor 18 is mechanically connected to an input side of a planetary gear 22. In this exemplary embodiment, planetary gear 22 is coaxially positioned with respect to an electric motor axis 26. Planetary gear 22 is additionally situated at a housing part 28 of the brake pressure generator, which may be a valve housing, for example.

Via planetary gear 22, the driving rotational speed of electric motor 18 is converted into a slower rotational speed. At an output side, planetary gear 22 is mechanically connected to a hydraulic module 30. Hydraulic module 30 may include a brake pressure piston which is movable in an axial direction via a spindle-nut arrangement for the generation of brake pressure. Drive train 14 shown in this exemplary embodiment is biaxially situated, which means that hydraulic module 30 is situated in parallel to electric motor axis 26.

Figure 2:
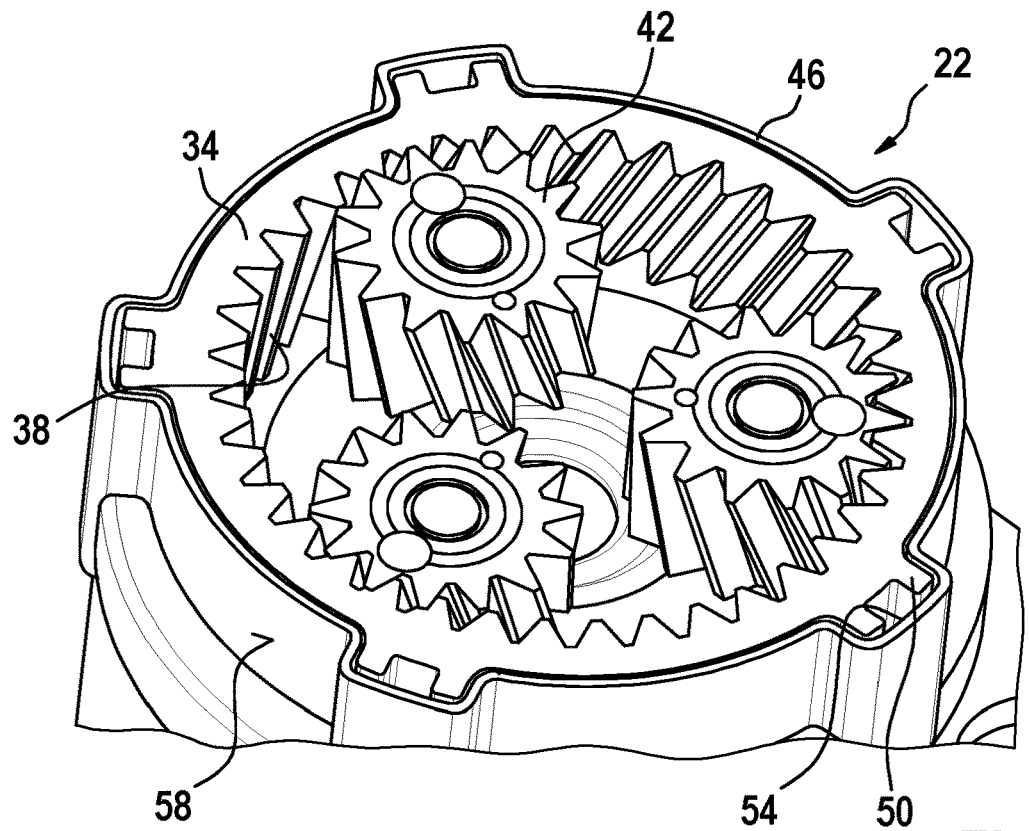
FIG. 2 shows a perspective view of a planetary gear according to the related art.

FIG. 2 shows a perspective view of a planetary gear 22 according to the related art. For the sake of clarity, one sun wheel 32 (see FIG. 3) was omitted in this planetary gear 22. In the process, planetary gear 22 includes an annulus gear 34 including internal teeth 38, which are obliquely configured here. Three planet wheels 42, which are engaged with internal teeth 38 of the annulus gear 34, are situated in annulus gear 34.

Annulus gear 34 is accommodated in an annulus gear receptacle 46. Annulus gear receptacle 46 is a deep-drawn sheet metal part. Annulus gear 34 includes multiple torque supports 50 at an outer circumference, which radially protrude beyond the circumference. These torque supports 50 are engaged in a form-locked manner with torque support grooves 54 formed by annulus gear receptacle 46, so that annulus gear 34 is held rotatably fixedly thereto in annulus gear receptacle 46. Accordingly, these torque support grooves 50 protrude beyond a radial outer side 58 of thin-walled annulus gear receptacle 46.

Figure 3:
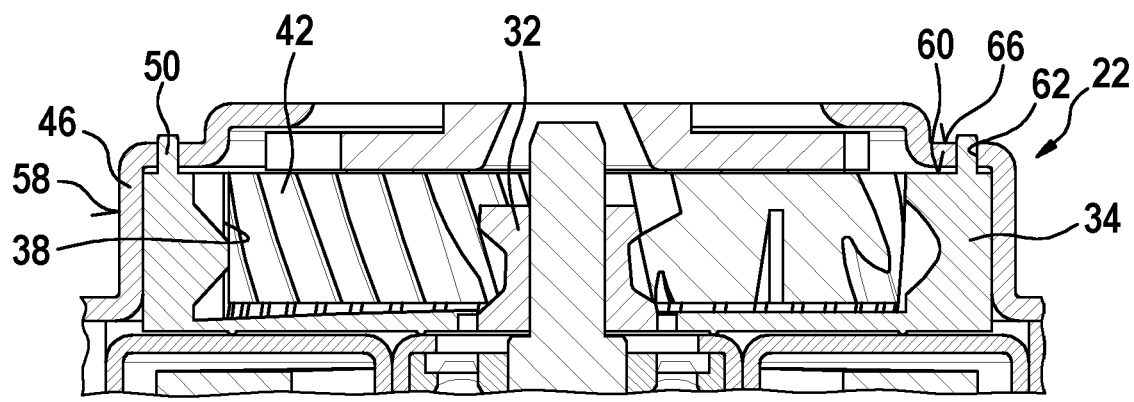
FIG. 3 shows a sectional view of one exemplary embodiment of a planetary gear according to an example embodiment of the present invention.

A sectional view of one exemplary embodiment of a planetary gear 22 according to the present invention is shown in FIG. 3. This figure additionally shows sun wheel 32. In contrast to the related art shown in FIG. 2, torque supports 50 extend from an axial annulus gear outer side 60 in an axial direction of planetary gear 22. In this exemplary embodiment, torque supports 50 are designed fixedly, i.e., in one piece, with annulus gear 34. Torque supports 50 cooperate with recesses 62 of annulus gear receptacle 46 in the process.

Recesses 62 are designed as round breakthroughs in the process, while torque supports 50 engaging in these breakthroughs have a pin shape. A length of torque supports 50 in this exemplary embodiment is dimensioned in such a way that torque supports 50 protrude beyond an axial outer side 66 of annulus gear receptacle 46. In one exemplary embodiment which is not shown, the portion of torque supports 50 protruding beyond axial outer side 66 may also be caulked, so that annulus gear 34 is additionally held in an axial direction at annulus gear receptacle 46.

In contrast to the related art shown in FIG. 2, no torque support grooves 54 are necessary. In this way, the required radial installation space may be saved. It is also possible to provide the radial installation space required in FIG. 2 for an annulus gear 34 which has a larger diameter, so that a higher gear ratio is achievable.

Figure 4:
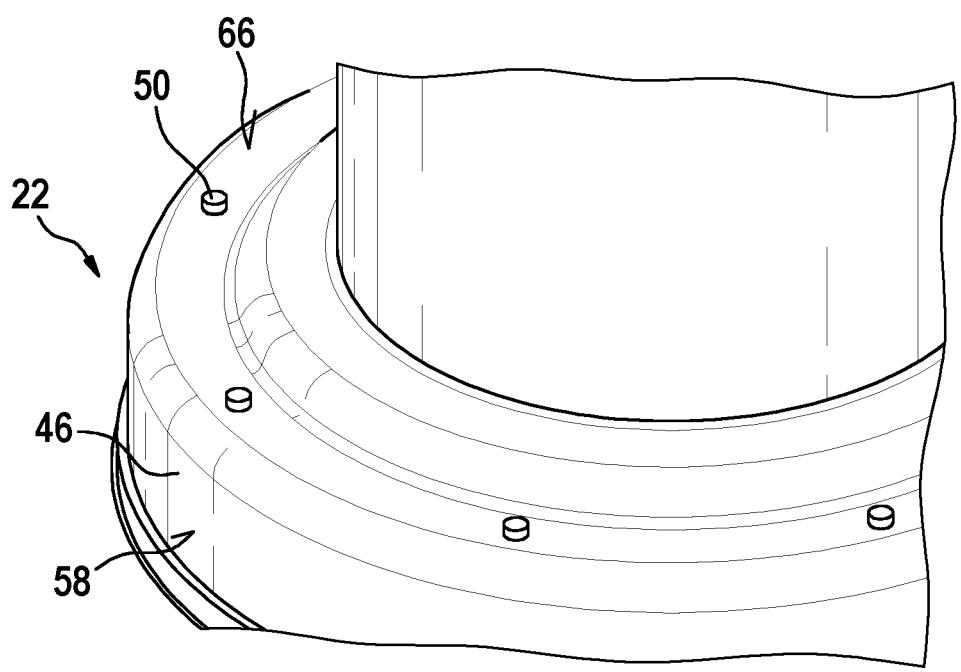
FIG. 4 shows a perspective view of the planetary gear of FIG. 3.

FIG. 4 shows a perspective view of planetary gear 22 of FIG. 3. It is clearly apparent here that a plurality of equidistantly situated axial torque supports 50 are provided to be able to transfer a sufficient torque between annulus gear 34 and annulus gear receptacle 46. It is also apparent that annulus gear receptacle 46 includes no torque support grooves 54 at radial outer side 58.

In one exemplary embodiment not shown here, torque supports 50 may also be formed by axial deep-drawn elements of annulus gear receptacle 46. In the process, these deep-drawn elements engage in corresponding recesses 62 in annulus gear 34.

What is claimed is:

1. An electromechanically drivable brake pressure generator for a hydraulic braking system of a vehicle, comprising:
   an electric motor, using which a driving rotational speed is generatable;
   a planetary gear, which is driven on an input side of the planetary gear by the electric motor to render a gear ratio of the driving rotational speed to be slow, the planetary gear including an annulus gear, which is accommodated rotatably fixedly to the planetary gear in an annulus gear receptacle;
   a hydraulic module, which is connected to an output side of the planetary gear and using which a brake pressure is generatable; and
   at least one torque support situated between the annulus gear and the annulus gear receptacle, which extends in an axial direction between te the planetary gear and the annulus gear receptacle and which cooperates with a recess so that the annulus gear and the annulus gear receptacle are held rotatably fixedly with respect to one another;
   wherein the electromechanically drivable brake pressure generator includes at least one of the following two features (I)-(II):
      (I) annulus gear extends from a center of the annulus gear to a circumferential exterior edge of the annulus gear in a radial direction that is perpendicular to the axial direction in which the at least one torque support extends; and
      (II) the at least one torque support is at least one of (i) pin-shaped, (ii) caulked at an axial outer side of the annulus gear receptacle, and (iii) made of a plastic material.

2. The electromechanically drivable brake pressure generator as recited in claim 1, wherein the at least one torque support is fixedly connected to the annulus gear.

3. The electromechanically drivable brake pressure generator as recited in claim 1, wherein the recess is formed in the annulus gear receptacle.

4. The electromechanically drivable brake pressure generator as recited in claim 1, wherein the at least one torque support is pin-shaped.

5. The electromechanically drivable brake pressure generator as recited in claim 1, wherein the at least one torque support is caulked at the axial outer side of the annulus gear receptacle.

6. The electromechanically drivable brake pressure generator as recited in claim 5, wherein the recess is a breakthrough.

7. The electromechanically drivable brake pressure generator as recited in claim 1, wherein the at least one torque support is made of the plastic material.

8. The electromechanically drivable brake pressure generator as recited in claim 1, wherein the annulus gear extends from the center of the annulus gear to the circumferential exterior edge of the annulus gear in the radial direction that is perpendicular to the axial direction in which the at least one torque support extends.

9. The electromechanically drivable brake pressure generator as recited in claim 8, wherein the at least one torque support is a deep-drawn element of the annulus gear receptacle which engages in the recess.

10. The electromechanically drivable brake pressure generator as recited in claim 1, wherein the at least one torque support is fixedly connected to the annulus gear receptacle.

11. The electromechanically drivable brake pressure generator as recited in claim 1, wherein the recess is formed in the annulus gear.

12. A vehicle comprising an electromechanically drivable brake pressure generator, the electromechanically drivable brake pressure generator including:
   an electric motor, using which a driving rotational speed is generatable;
   a planetary gear, which is driven on an input side of the planetary gear by the electric motor to render a gear ratio of the driving rotational speed to be slow, the planetary gear including an annulus gear, which is accommodated rotatably fixedly to the planetary gear in an annulus gear receptacle;
   a hydraulic module, which is connected to an output side of the planetary gear and using which a brake pressure is generatable; and
   at least one torque support situated between the annulus gear and the annulus gear receptacle, which extends in an axial direction between to the planetary gear and the annulus gear receptacle and which cooperates with a recess so that the annulus gear and the annulus gear receptacle are held rotatably fixedly with respect to one another;
   wherein the electromechanically drivable brake pressure generator includes at least one of the following two features (I)-(II):
      (I) annulus gear extends from a center of the annulus gear to a circumferential exterior edge of the annulus gear in a radial direction that is perpendicular to the axial direction in which the at least one torque support extends; and
      (II) the at least one torque support is at least one of (i) pin-shaped, (ii) caulked at an axial outer side of the annulus gear receptacle, and (iii) made of a plastic material.

13. The vehicle as recited in claim 12, wherein the annulus gear extends from the center of the annulus gear to the circumferential exterior edge of the annulus gear in the radial direction that is perpendicular to the axial direction in which the at least one torque support extends.

14. The vehicle as recited in claim 12, wherein the at least one torque support is pin-shaped.

15. The vehicle as recited in claim 12, wherein the at least one torque support is caulked at the axial outer side of the annulus gear receptacle.

16. The vehicle as recited in claim 12, wherein the at least one torque support is made of the plastic material.

* * * * *